(12) United States Patent
Tada (10) Patent No.: US 9,499,116 B2
(45) Date of Patent: Nov. 22, 2016

(54) OCCUPANT PROTECTION DEVICE AND PROGRAM

(71) Applicant: Autoliv Development AB, Vårgårda (SE)

(72) Inventor: Tatsuo Tada, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/054,762

(22) Filed: Feb. 26, 2016

(65) Prior Publication Data

US 2016/0257273 A1    Sep. 8, 2016

(30) Foreign Application Priority Data

Mar. 3, 2015    (JP) .................................. 2015-041486
Jan. 27, 2016    (JP) .................................. 2016-013661

(51) Int. Cl.
| | |
|---|---|
| *B60R 21/16* | (2006.01) |
| *B60R 21/015* | (2006.01) |
| *B60R 21/00* | (2006.01) |
| *B60R 21/01* | (2006.01) |

(52) U.S. Cl.
CPC .. B60R 21/01512 (2014.10); *B60R 2021/0032* (2013.01); *B60R 2021/01265* (2013.01); *B60R 2021/01286* (2013.01)

(58) Field of Classification Search
CPC .................. B60R 21/0152; B60R 2021/0032; B60R 2021/01265; B60R 2021/02186

USPC .......................................................... 701/45
See application file for complete search history.

(56) References Cited

U.S. PATENT DOCUMENTS

| | | | | |
|---|---|---|---|---|
| 6,213,510 B1* | 4/2001 | Suyama | ............... | B60R 22/341 280/805 |
| 2001/0040065 A1* | 11/2001 | Takagi | .............. | B60R 21/01516 180/274 |
| 2009/0099735 A1* | 4/2009 | McCoy | ............... | B60R 21/0134 701/46 |

FOREIGN PATENT DOCUMENTS

JP    2013-103603 A    5/2013

* cited by examiner

*Primary Examiner* — Richard Camby
(74) *Attorney, Agent, or Firm* — Brinks Gilson & Lione (57) ABSTRACT

An occupant protection device for protecting an occupant in frontal and oblique crashes. The occupant protection device operates an airbag and switches a load limiting restraint load of the seat belt between a first load limit value and a second lower load limit value. A switching unit switches the restraint load based upon the physique of the occupant, and lateral acceleration or movement of the occupant during an impact. The second load value is set for a small physique occupant. The load value is switched from the first to the second load value after a predetermined time if the lateral acceleration or occupant movement falls below predetermined levels. For a large physique occupant with lateral acceleration or movement exceeding predetermined levels, the load limiter does not switch to the second load value after the predetermined time.

17 Claims, 8 Drawing Sheets

OCCUPANT PROTECTION DEVICE AND PROGRAM

CROSS-REFERENCE TO RELATED APPLICATIONS

This application claims priority to Japanese Application Nos. JP2015-041486, filed on Mar. 3, 2015 and JP2016-013661, filed on Jan. 27, 2016.

1. FIELD OF THE INVENTION

The present invention relates to an occupant protection device or the like provided in a vehicle.

2. DESCRIPTION OF THE RELATED ART

Conventionally, a technique of protecting an occupant with appropriate restraining force (restraint load) by reducing the restraint load provided by a seat belt according to the physique of an occupant after a high level restraint load is provided by the seat belt when an airbag operates in the event of a vehicle crash is known (for example, see Japanese Patent Application Publication No. 2013-103603).

However, the technique disclosed in Japanese Patent Application Publication No. 2013-103603 assumes a frontal crash only in which a crash occurs from the front surface of a vehicle. When a crash occurs such that an acceleration is applied in a vehicle width direction (a lateral direction), in a state in which an acceleration occurs in the vehicle in a vehicle front-rear direction such as an oblique crash in which a crash occurs in only a portion of a front surface of a vehicle, an occupant may deviate from a range in which the occupant is protected by an airbag if the seat belt restraint load is reduced.

SUMMARY OF THE INVENTION

An object of an aspect of the present invention is to provide an occupant protection device or the like capable of appropriately protecting an occupant when an acceleration occurs in a vehicle width direction in a state in which a crash that generates such force that rotates a vehicle, or a crash in a front direction of the vehicle occurs in the event of a crash such as a crash occurring from an oblique direction on the front side of the vehicle, or a crash (a small overlap crash) occurring from the front side in the front-left or front-right end of the vehicle or when a frontal crash occurs in a state in which an acceleration occurs in a vehicle width direction (i.e. there is a significant lateral acceleration force component).

According to an aspect of the present invention, there is provided an occupant protection device that operates an airbag and switches a restraint load of a seat belt, indicating a force with which the seat belt restrains an occupant according to a physique of the occupant, between a first load value and a second load value smaller than the first load value The occupant protection device includes: a physique identification unit that identifies or classifies the physique of the occupant; a physique determining unit that determines whether the physique of the occupant identified by the physique identification unit is equal to or larger than a predetermined physique; an acceleration acquisition unit that acquires an acceleration value in a vehicle width (lateral) direction from an acceleration detection unit that detects the acceleration value; an acceleration determining unit that determines whether a value based on the acceleration value acquired by the acceleration acquisition unit is equal to or smaller than a predetermined value; and a switching unit that switches the restraint load of the seat belt between the first load value and the second load value smaller than the first load value based on the results obtained by the physique determining unit and the acceleration determining unit. The switching unit switches the restraint load of the seat belt to the second load value smaller than the first load value during restraint of the seat belt when the physique determining unit determines that the physique of the occupant is equal to or larger than the predetermined physique and the acceleration determining unit determines that the value based on the acceleration value in the vehicle width direction is equal to or smaller than the predetermined value, and maintains the restraint load of the seat belt at the first load value when the physique determining unit determines that the physique of the occupant is equal to or larger than the predetermined physique and the acceleration determining unit determines that the value based on the acceleration value in the vehicle width direction is larger than the predetermined value.

According to another aspect of the present invention, there is provided an occupant protection device that operates an airbag and switches a restraint load of a seat belt, indicating a force with which the seat belt restrains an occupant according to a physique of the occupant, between a first load value and a second load value smaller than the first load value, the occupant protection device including: a physique identification unit that identifies the physique of the occupant; a physique determining unit that determines whether the physique of the occupant identified by the physique identification unit is equal to or larger than a predetermined physique; a movement determining unit that determines whether the occupant has moved in a vehicle width direction; and a switching unit that switches the restraint load of the seat belt between the first load value and the second load value smaller than the first load value based on the results obtained by the physique determining unit and the movement determining unit. Wherein the switching unit switches the restraint load of the seat belt to the second load value when the physique determining unit determines that the physique of the occupant is equal to or larger than the predetermined physique and the movement determining unit determines that the occupant has not moved in the vehicle width direction, and maintains the restraint load of the seat belt at the first load value when the physique determining unit determines that the physique of the occupant is equal to or larger than the predetermined physique and the movement determining unit determines that the occupant has moved in the vehicle width direction.

The occupant protection device according to the aspect of the present invention further includes an imaging unit that images a vehicle interior to obtain an image, and the movement determining unit determines whether the occupant has moved in the vehicle width direction by performing image processing on the image obtained by the imaging unit.

According to still another aspect of the present invention, there is provided a program used in an occupant protection device that operates an airbag and switches a restraint load of a seat belt, indicating a force with which the seat belt restrains an occupant according to a physique of the occupant, between a first load value and a second load value smaller than the first load value, the program causing the occupant protection device to execute the following steps: determining whether a physique of the occupant is equal to or larger than a predetermined physique; determining whether a value based on an acceleration value in a vehicle width direction is equal to or smaller than a predetermined value; switching the restraint load of the seat belt to the second load value smaller than the first load value during restraint of the seat belt when it is determined that the physique of the occupant is equal to or larger than the predetermined physique and that the value based on the acceleration value in the vehicle width direction is equal to or smaller than the predetermined value; and maintaining the restraint load of the seat belt at the first load value when it is determined that the physique of the occupant is equal to or larger than the predetermined physique and that the value based on the acceleration value in the vehicle width direction is larger than the predetermined value.

According to still another aspect of the present invention, there is provided a program used in an occupant protection device is configured such that operates an airbag and switches a restraint load of a seat belt, indicating a force with which the seat belt restrains an occupant according to a physique of the occupant, between a first load value and a second load value smaller than the first load value, the program configured for causing the occupant protection device to execute: determining whether a physique of the occupant is equal to or larger than a predetermined physique; determining whether the occupant has moved in a vehicle width direction; switching the restraint load of the seat belt to the second load value smaller than the first load value during restraint of the seat belt when it is determined that the physique of the occupant is equal to or larger than the predetermined physique and that the occupant has not moved in the vehicle width direction; and maintaining the restraint load of the seat belt at the first load value when it is determined that the physique of the occupant is equal to or larger than the predetermined physique and that the occupant has moved in the vehicle width direction.

According to an aspect of the present invention, it is possible to appropriately protect an occupant when an acceleration occurs in a vehicle width direction in a state in which a crash that generates such force that rotates a vehicle, or a crash in a front direction of the vehicle occurs in the event of a crash such as a crash occurring from an oblique direction on the front side of the vehicle, or a crash (a small overlap crash) occurring from the front side in the front-left or front-right end of the vehicle or when a frontal crash occurs in a state in which an acceleration occurs in a vehicle width direction.

BRIEF DESCRIPTION OF THE DRAWINGS

The drawings illustrate embodiments of the invention wherein.

DESCRIPTION OF THE PREFERRED EMBODIMENTS

First Embodiment

Figure 1:
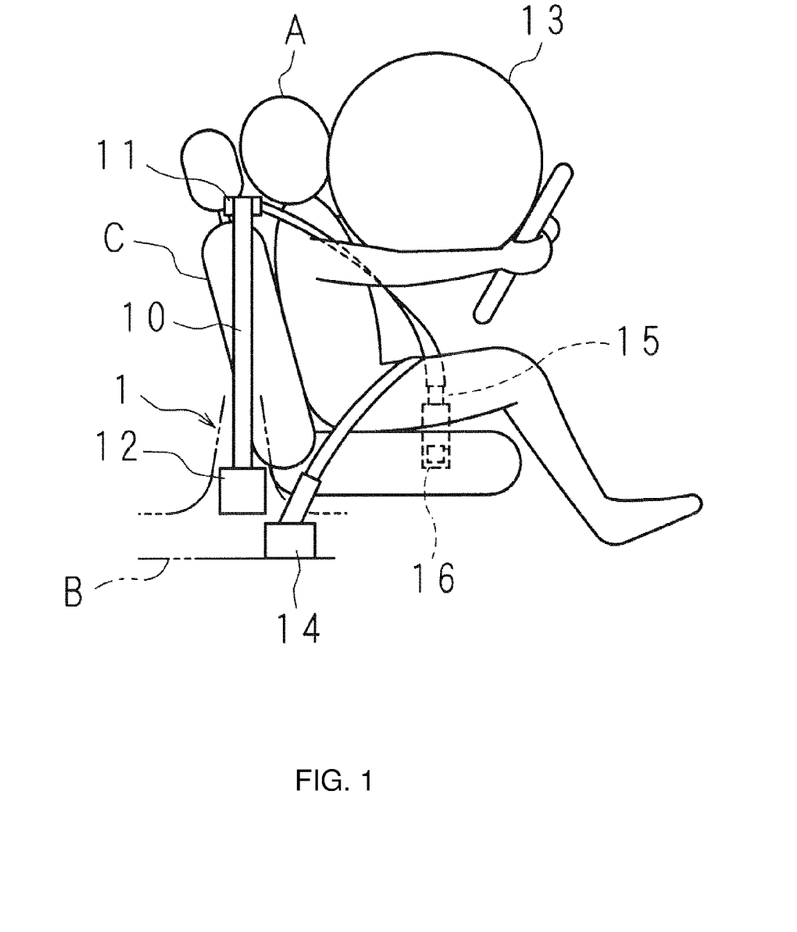
FIG. 1 is a diagram for describing an outline of an occupant protection device.

Hereinafter, an example of the present embodiment will be described with reference to the drawings. FIG. 1 is a diagram for describing an outline of an occupant protection device 1. The occupant protection device 1 includes a seat belt 10 for restraining an occupant A to be in a seat C, a retractor 12 that winds the seat belt 10 so as to be freely pulled, and an airbag 13 that protects the occupant A from an impact. The airbag 13 is provided in a steering wheel, for example. The seat belt 10 is a two- or three-point type seat belt, for example. In the present embodiment, the occupant protection device 1 having a three-point seat belt will be described.

One end of the seat belt 10 is connected to the retractor 12. The seat belt 10 pulled from the retractor 12 is folded back at a through-anchor 11 arranged above a center pillar B, for example, and the other end of the seat belt 10 is connected to an anchor 14 fixed to a lower portion of the center pillar B. Moreover, a tongue plate 15 is movably inserted along an intermediate portion of the seat belt 10. The tongue plate 15 is attached to a buckle 16 arranged on an opposite side from the retractor 12 with the seat C interposed.

Figure 2:
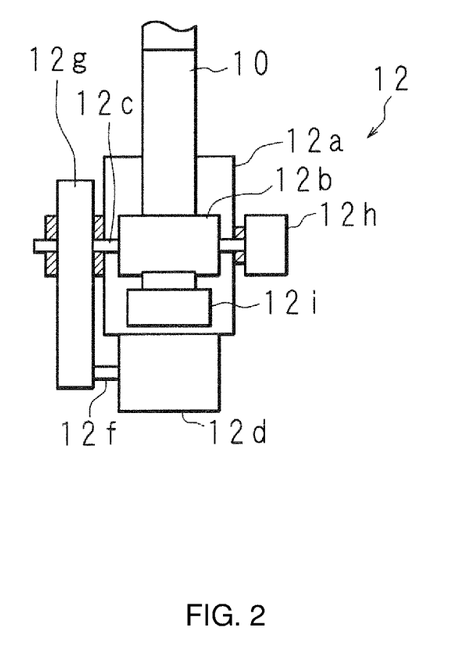
FIG. 2 is a schematic diagram illustrating a configuration of a retractor.

FIG. 2 is a schematic diagram illustrating a configuration of the retractor 12. The retractor 12 includes a winding shaft 12$b$ that is rotatably provided in a metal frame 12$a$, a residual winding amount sensor 12$i$ that is provided under the winding shaft 12$b$ (spool) so as to detect the amount of a webbing wound in the retractor, a shaft portion 12$c$ that protrudes axially outward from a central portion of the winding shaft 12$b$, a gas generator-type pretensioner 12$h$ connected to one end of the shaft portion 12$c$, a power transmission mechanism 12$g$ connected to the other end of the shaft portion 12$c$, and a motor 12$d$ connected to the power transmission mechanism 12$g$ with a driving shaft 12$f$ interposed. The winding shaft 12$b$ is connected to one end of the seat belt 10 and is biased by a winding spring (not illustrated) in a rotation direction in which the seat belt 10 is wound.

The motor 12$d$ rotates the driving shaft 12$f$ at least in a winding direction of the seat belt 10 under the control of a control unit 111 described later. The motor 12$d$ may make normal and reverse rotations in the winding direction and the pulling direction, respectively. The power transmission mechanism 12$g$ is a clutch, for example, and transmits the rotation of the driving shaft 12$f$ of the motor 12$d$ to the shaft portion 12$c$ to rotate the winding shaft 12$b$ with the transmitted driving force of the motor 12$d$.

The pretensioner 12$h$ includes a gas generator, an ignition agent that ignites the gas generator, and a mechanism that transmits the pressure of the gas generated from the gas generator to the winding shaft 12$b$ as rotating force of the winding shaft 12$b$. When the control unit 111 described later detects a vehicle crash, or immediately before a crash when it is determined by crash prediction control that it is impossible to avoid a crash, current flows into the ignition agent, gas is generated from the gas generator, and the winding shaft 12$b$ rotates in a belt winding direction with the pressure of the generated gas.

The residual winding amount sensor 12$i$ detects a belt winding amount from an advancing/retracting position of an advancing/retracting rod (not illustrated) that advances or retracts according to the winding amount of the seat belt 10 and outputs the detected winding amount to the control unit 111 described later. The control unit 111 calculates the physique of the occupant A who uses the seat belt 10, for example from the acquired winding amount and acquires the calculated physique of the occupant A. The physique is the body size such as the weight, load, waist measurement, or height of the occupant A, and in the present embodiment, the physique indicates the height and weight of the occupant A or the weight only. The control unit 111 may alternatively identify the physique of the occupant A from a pressure sensor (not illustrated) attached to the seat. The force limiter load (restraint load) of the seat belt 10 indicates the maximum load applied from the seat belt 10 to the occupant A when the occupant A is restrained by the seat belt 10 in the event of a vehicle crash and different force limiter load values are set according to the physique. The force limiter load (restraint load) is detected as webbing tension (tension force).

Figure 3:
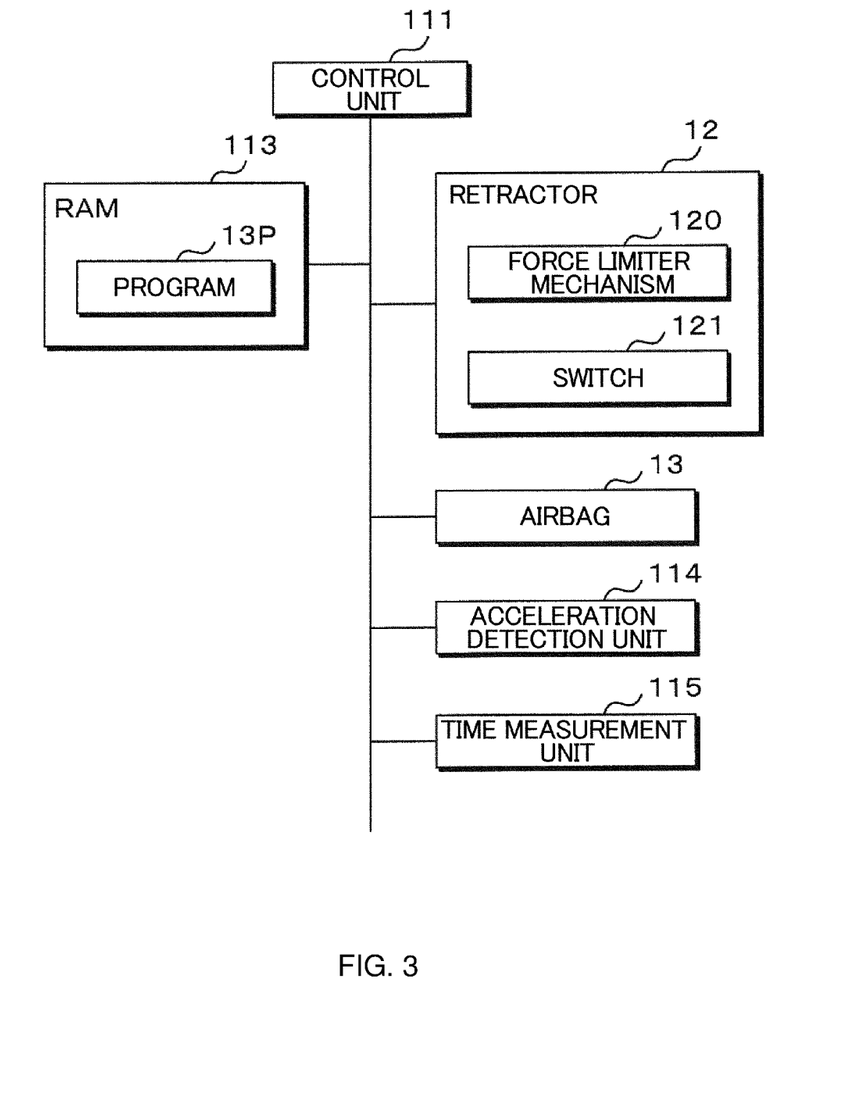
FIG. 3 is a block diagram illustrating a hardware configuration of the occupant protection device.

FIG. 3 is a block diagram illustrating a hardware configuration of the occupant protection device 1. The occupant protection device 1 includes the control unit 111, the retractor 12, the airbag 13, a RAM 113, an acceleration detection unit 114, a time measurement unit 115, and the like. The control unit 111 such as an electronic control unit (ECU) is connected to hardware units via a transmission line by a controller area network (CAN). The control unit 111 controls these hardware units and executes various software functions according to a program 13P stored in the RAM 113.

The retractor 12 includes a force limiter mechanism 120 and a switch (a switching unit) 121 provided in the winding shaft 12b. The force limiter mechanism is not illustrated but the force limiter mechanism may be of a type which includes a torsion bar that is provided in the winding shaft 12b (a spindle) as an example and has one end coupled to the winding shaft and the other end configured to be locked in relation to the frame 12a in an emergency situation of the vehicle. The torsion bar has at least two columnar portions having different thicknesses (outer diameters) or other differences related to their torsional stiffness and deformation characteristics. The different thicknesses (outer diameters) means that torsional forces (restraint loads) are different. When a load of a predetermined value or larger acts on the seat belt 10, the force limiter mechanism 120 absorbs the rotating force in the pulling direction of the seat belt 10 with the restraint load (torsional force) corresponding to the thickness of the torsion bar or another characteristic. After the pretensioner operates, the winding shaft 12b is temporarily locked to the frame. In a state in which the winding shaft is locked, the force limiter mechanism 120 may select an appropriate thickness (the restraint load) or other characteristic among the different columns of the torsion bar by switching the switch 121. Under a predetermined condition, the restraint load (the force limiter load) of the seat belt 10 is switched to a first load value or a second load value smaller than the first load value by the force limiter mechanism. The switch 121 operates based on an instruction of the control unit 111. With the switching of the switch 121, the force limiter mechanism 120 selects any one of the first load value applied by the torsion bar that restrains the load of an occupant having a large physique and the second load value applied by the torsion bar having a load limiting value lower than the first load value. In the example of the present embodiment, in an initial state in which the switch 121 does not operate, the first load value having a high restraint load is selected. With the operation of the switch 121, the first load value is switched to the second load value having a low restraint load.

A control signal is input from the control unit 111 to the airbag 13 by communication. When the control signal is input to the airbag 13, an electric heating portion of an inflator (not illustrated) provided in the airbag 13 generates heat. The heated electric heating portion ignites a combustible material near the electric heating portion and a gas generator adjacent to the material combusts. The ignited gas generator fills a cushioning bag diffuser provided in the airbag 13 with gas. The cushioning bag is formed of a material such as a vinyl chloride or a cloth, for example, and is configured to inflate when the inside thereof is filled with gas.

The cushioning airbag 13 is initially provided in a folded state. The airbag 13 is deployed toward the front of the occupant A by inflating the cushioning bag. In this way, the airbag 13 cushions a frontal impact applied to the occupant A and restricts the occupant A from being ejected from a front window and colliding with the steering wheel or the instrument panel.

The acceleration detection unit 114 is a sensor that detects acceleration applied to the vehicle. The acceleration detection unit 114 is provided at the rear side of a front bumper of the vehicle or the center pillar B on both side surfaces of the vehicle. The position at which the acceleration detection unit 114 is provided is not limited to the rear side of the front bumper and the center pillar B. The acceleration detection unit 114 may be provided in the control unit 111. The acceleration detection unit 114 is an electrostatic capacitance-type acceleration sensor or a piezoelectric resistance-type acceleration sensor, for example, and detects an acceleration value in the front-rear direction of the vehicle and the vehicle width (lateral) direction. The acceleration detection unit 114 outputs the detected acceleration value to the control unit 111 at a predetermined cycle by communication. The predetermined cycle is 1 microseconds, for example. The time measurement unit 115 measures the time at the present time point, for example, and outputs the time measurement result to the control unit 111 according to a request of the control unit 111.

Figure 4A:
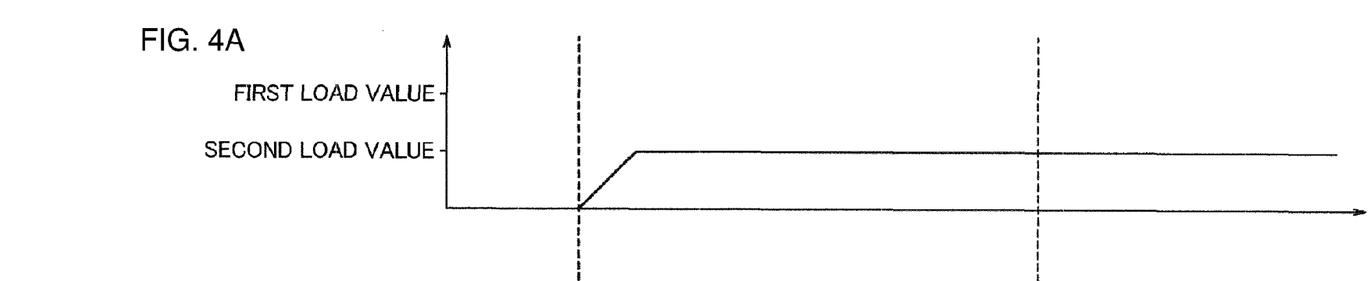
FIGS. 4A, 4B, and 4C are timing charts illustrating an example of an operation of the occupant protection device when a crash occurs in the front of a vehicle.
Figure 4B:
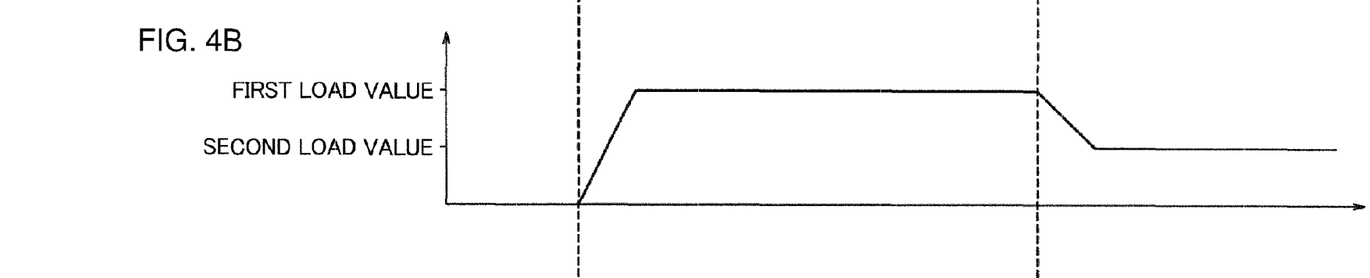
Figure 4C:
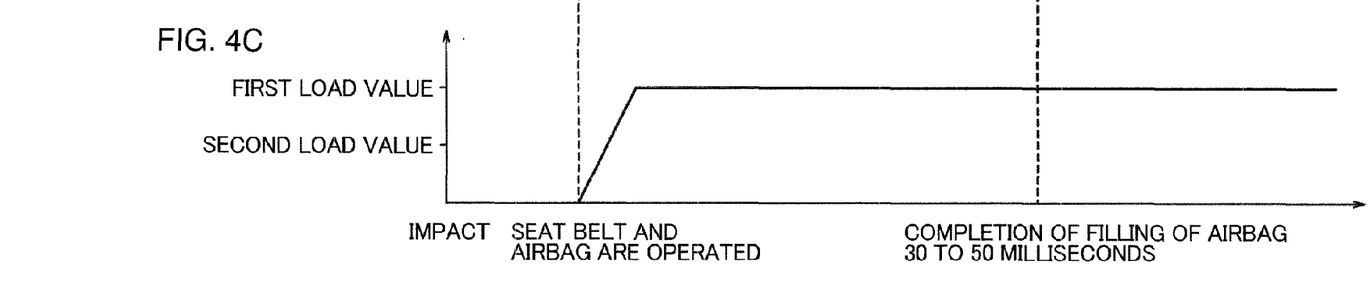

FIGS. 4A to 4C are representative timing charts illustrating an example of the operation of the occupant protection device 1 when a crash occurs in the front of a vehicle. FIG. 4A is a diagram illustrating a change in the restraint load (the force limiter load or the webbing tension force) of the seat belt 10 when the physique of the occupant A is smaller than a predetermined physique (for example, the size, weight, or load of a body portion). The vertical axis indicates the value of the restraint load and the unit thereof is N (Newton). The horizontal axis indicates the time elapsed from the occurrence of a crash and the unit thereof is milliseconds. FIG. 4B is a diagram illustrating a change in the restraint load (the force limiter load or the webbing tension force) of the seat belt 10 when the physique of the occupant A is equal to or larger than a predetermined physique. FIG. 4C is a diagram illustrating a change in the restraint load (the force limiter load or the webbing tension force) of the seat belt 10 when the physique of the occupant A is equal to or larger than a predetermined physique (weight or load) and an acceleration value in the vehicle width direction exceeds a predetermined acceleration value. Hereinafter, the detailed operation of the occupant protection device 1 will be described with reference to FIGS. 4A to 4C.

The control unit 111 acquires an acceleration value from the acceleration detection unit 114. The control unit 111 integrates the acquired acceleration value over a predetermined period. The predetermined period is two milliseconds, for example. The control unit 111 determines whether a vehicle crash has occurred by determining whether the integrated acceleration value is equal to or larger than a predetermined crash threshold. The predetermined crash threshold is an acceleration value in the vehicle front-rear direction when external force with which the airbag 13 is to operate is applied. Although the control unit 111 of the present embodiment integrates the acquired acceleration value over a predetermined period, the embodiment is not limited to this. For example, the control unit 111 may calculate an average of the acceleration value over a predetermined period.

When it is determined that the acceleration value integrated by the acceleration detection unit 114 is equal to or larger than the predetermined crash threshold, the control unit 111 inflates the cushioning bag of the airbag 13. The control unit 111 identifies the physique (the size or the like of the body portion) of the occupant A calculated from the winding amount detected by the residual winding amount sensor 12i or the physique (the weight, load, or the like) of the occupant A detected by the pressure sensor, or by other means. When the physique is such a weight of 40 kg to 50 kg as indicated by the AF05 dummy (height: 145 cm and weight: 45 kg), for example, since the physique of the occupant A is smaller than the predetermined physique, the control unit 111 switches the restraint load (the force limiter load) to the second load value with the aid of the switch 121. When restraint starts, the restraint load (the force limiter load) of the seat belt 10 is set to the second load value by the force limiter mechanism of the retractor 12. That is, when the physique of the occupant A is smaller than the predetermined physique, the retractor 12 appropriately restrains the occupant A by setting the restraint load of the seat belt 10 to the second (reduced) load value (see FIG. 4A).

Moreover, when the physique of the occupant A is equal to or larger than the predetermined physique as indicated by the AM50 dummy (height: 175 cm and weight: 78 kg), for example, the control unit 11 does not operate the switch 121 in an initial stage of restraint but restrains the occupant A with the restraint load (the force limiter load) of the first load value larger than the second load value. That is, when the physique of the occupant A is equal to or larger than the predetermined physique, the retractor 12 restrains the occupant A by setting the force limiter load of the seat belt 10 to the first load value. Since the restraint of the seat belt 10 with the first load value is high, when the occupant A is restrained by the seat belt 10, the load received from the seat belt 10 may increase greatly in the latter half of a crash, which may be excessive for the occupant A. Thus, after a predetermined period is elapsed from the start of operation the airbag 13, the control unit 111 changes the restraint load from the first load value to the second load value lower than the first load value with the aid of the switch 121. The predetermined period is a period required until the airbag 13 is deployed toward the front of the occupant A and the restraint on the occupant A by the airbag starts after the cushioning bag of the airbag 13 operates. The predetermined period is approximately between 30 milliseconds and 50 milliseconds, for example. The retractor 12 decreases the restraint load of the seat belt 10 to the second load value and the seat belt 10 maintains the restraint with the second load value so that the occupant A does not collide with the interior parts of the vehicle (see FIG. 4B).

When it is expected that the occupant A moves in the vehicle width direction due to acceleration directed in the vehicle width direction in a state in which a frontal crash occurs in the vehicle, if the force limiter load (the restraint load) of the seat belt is reduced, the occupant may slip out of the seat belt depending on a collision direction. In this case, the occupant A deviates from a range where the occupant A is protected by the airbag. The occupant protection device 1 performs the following operations to prevent this from occurring. When the cushioning bag of the airbag 13 is sufficiently deployed toward the front of the occupant A, the control unit 111 determines whether a value (acceleration, velocity, or distance) based on the acceleration value in the vehicle width direction is equal to or smaller than a predetermined value (acceleration, velocity, or distance). When it is determined that the value (acceleration, velocity, or distance) based on the acceleration value in the vehicle width direction is not equal to or smaller than the predetermined value (acceleration, velocity, or distance) (that is, when it is determined that the value (acceleration, velocity, or distance) based on the acceleration value in the vehicle width direction exceeds the predetermined value (acceleration, velocity, or distance)), the control unit 111 maintains the restraint load of the seat belt 10 at the first load value for an occupant having a predetermined physique (the hybrid III AM50 dummy (height: 175 cm and weight 78 kg) which is a frontal crash test dummy determined by the US National Highway Traffic Safety Administration (NHTSA) standard, for example, and corresponds to an average American adult male) even in the latter half of a crash (see FIG. 4C). The predetermined value (acceleration, velocity, or distance) in the vehicle width direction is a value (acceleration, velocity, or distance) at which it is likely that the occupant slips out of the seat belt and the body of the occupant A deviates from the restraining surface of the airbag 13 in front of the occupant.

Figure 5:
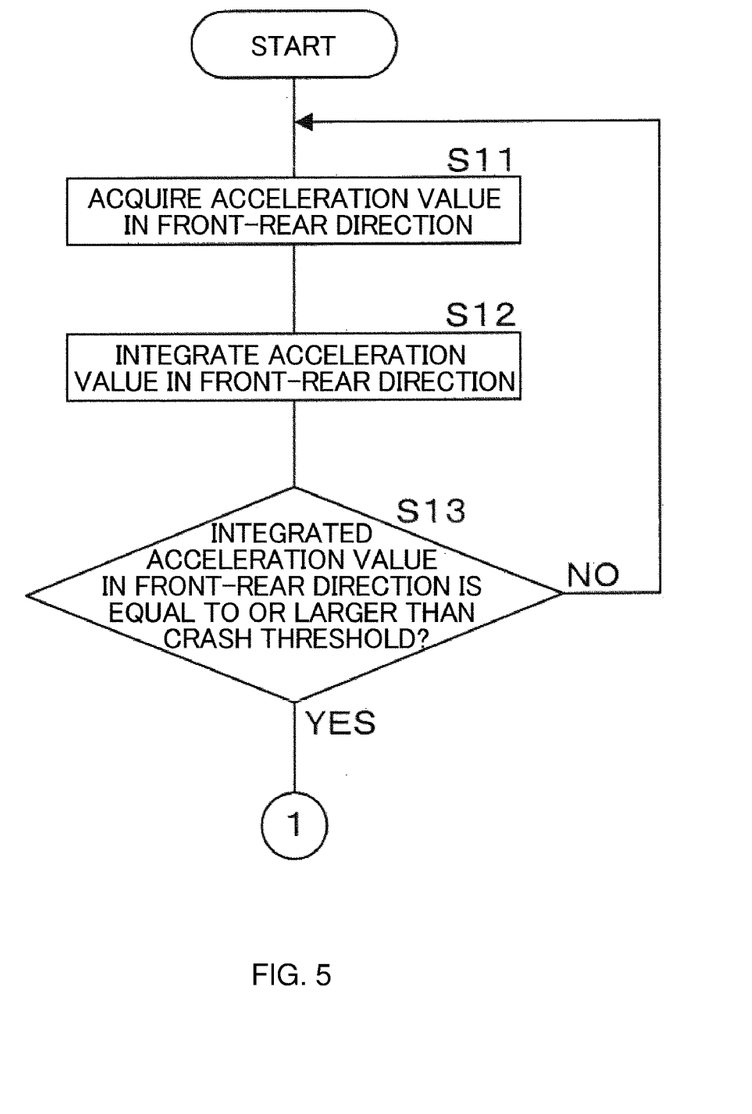
FIG. 5 is a flowchart illustrating a processing procedure of a control unit according to the present embodiment.
Figure 6:
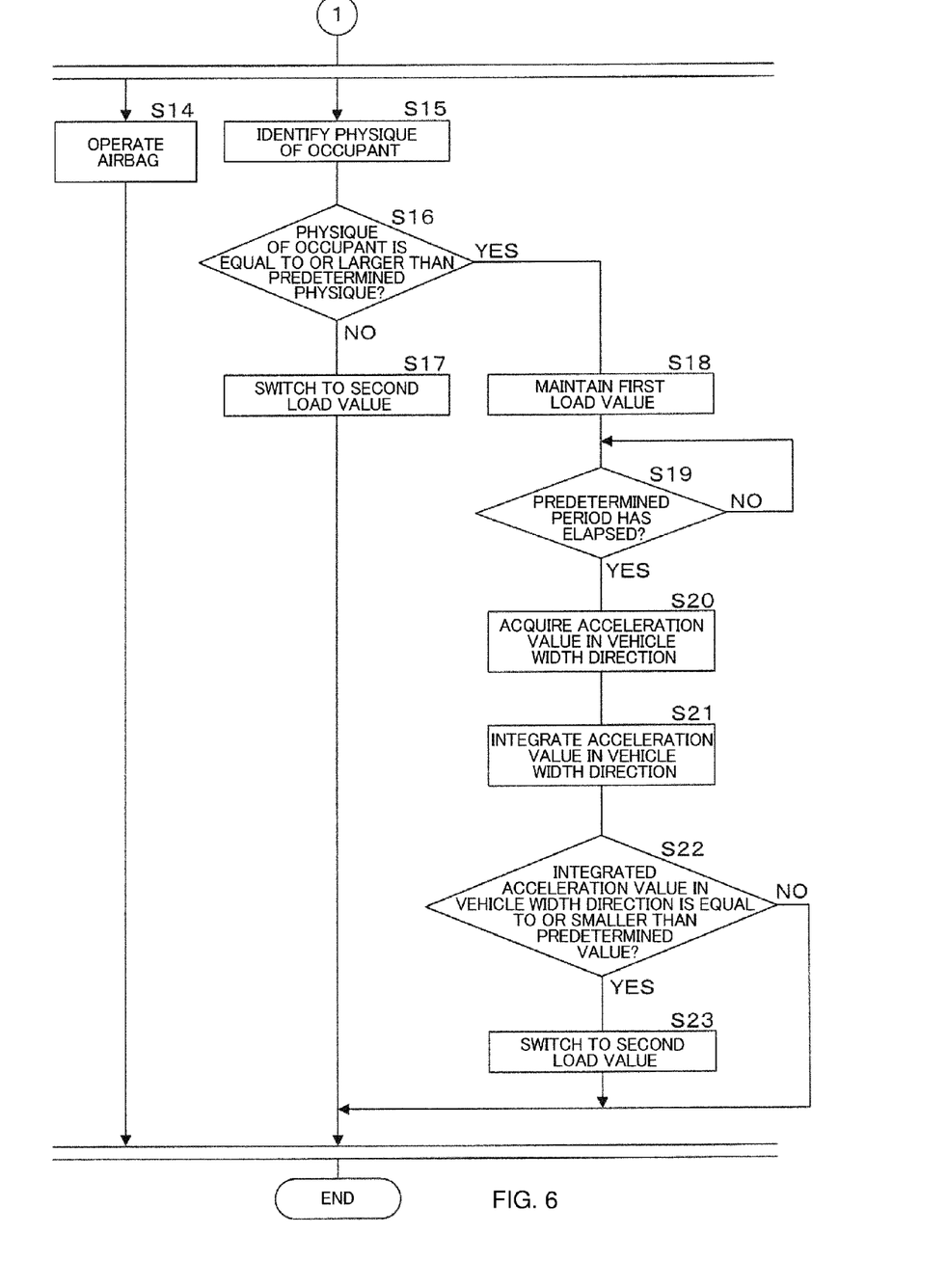
FIG. 6 is a flowchart illustrating a processing procedure of the control unit according to the present embodiment.

FIGS. 5 and 6 are flowcharts illustrating the processing procedure of the control unit 111 in the example of the present embodiment. The control unit (acceleration acquisition unit) 111 acquires an acceleration value in the front-rear direction from the acceleration detection unit 114 (step S11). The control unit 111 integrates the acquired acceleration value in the front-rear direction over a predetermined period (step S12). The control unit 111 determines whether the integrated acceleration value in the front-rear direction is equal to or larger than a crash threshold (step S13). That is, the control unit 111 determines whether a vehicle crash has occurred based on the acceleration value. When it is determined that the integrated acceleration value in the front-rear direction is not equal to or larger than the crash threshold (step S13: NO), the flow proceeds to step S11 and the control unit 111 repeats the process until the acceleration value is equal to or larger than the crash threshold. When it is determined that the integrated acceleration value in the front-rear direction is equal to or larger than the crash threshold (step S13: YES), the control unit 111 operates the airbag 13 (step S14) and ends the process.

On the other hand, in the control of the seat belt, when a crash is detected, the control unit (physique identification unit) 111 identifies the physique from the size of the occupant A calculated from the winding amount detected by the residual winding amount sensor 12i or the weight or load of the occupant A detected by the pressure sensor (step S15), or by other means. The control unit (physique determining unit) 111 determines whether the physique of the occupant A is equal to or larger than the predetermined physique (step S16). When it is determined that the physique of the occupant A is not equal to or larger than the predetermined physique (step S16: NO) (that is, when it is determined that the physique of the occupant A is smaller than the predetermined physique), the control unit 111 switches the restraint load to the second load value with the aid of the switch 121 (step S17) and ends the process.

When it is determined that the physique of the occupant A is equal to or larger than the predetermined physique (step S16: YES), the control unit 111 does not operate the switch 121 but maintains the restraint load at the first load value (step S18). The control unit 111 determines whether a predetermined period has elapsed with the aid of the time measurement unit 115 (step S19). When it is determined by the time measurement unit 115 that the predetermined period has not elapsed after the airbag 13 starts operating (step S19: NO), the control unit 111 waits until the predetermined period elapses. Here, the predetermined period is a period required for the airbag to substantially complete the deployment, for example. When it is determined by the time measurement unit 115 that the predetermined period has elapsed (step S19: YES), the control unit 111 acquires the acceleration value in the vehicle width direction from the acceleration detection unit 114 (step S20). The control unit 111 integrates the acquired acceleration value in the vehicle width direction over a predetermined period (step S21). The control unit (acceleration determining unit) 111 determines whether the integrated acceleration value in the vehicle width direction is equal to or smaller than a predetermined value (velocity or distance) (step S22). That is, the control unit (movement determining unit) 111 determines whether the occupant A is likely to move in the vehicle width direction by determining whether the integrated acceleration value in the vehicle width direction is equal to or smaller than a predetermined value (velocity or distance). When it is determined that the integrated acceleration value in the vehicle width direction is not equal to or smaller than the predetermined value (velocity or distance) (step S22: NO) (that is the occupant A has moved in the vehicle width direction), the control unit 111 ends the process (corresponding to FIG. 4C). When it is determined that the integrated acceleration value in the vehicle width direction is equal to or smaller than the predetermined value (velocity or distance) (step S22: YES) (that is, it is determined that the occupant A has not moved in the vehicle width direction), the control unit 111 switches the restraint load to the second load value with the aid of the switch 121 (step S23) and ends the process (corresponding to FIG. 4B).

According to an aspect of the present invention, it is possible to appropriately protect the occupant A when an acceleration occurs in a vehicle width direction in a state in which a crash that generates such force that rotates a vehicle or a crash in a front direction of the vehicle occurs in the event of a crash such as a crash occurring from an oblique direction on the front side of the vehicle or a crash (a small overlap crash) occurring from the front side in the front-left or front-right end of the vehicle or when a frontal crash occurs in a state in which an acceleration occurs in a vehicle width direction.

According to an aspect of the present invention, it is possible to accurately understand that a change in a movement (velocity or distance) of the occupant A has occurred in the vehicle width direction by acquiring the acceleration value in the vehicle width direction. In the control of the seat belt, although the velocity or distance is calculated from the integrated acceleration value and is used as a threshold, the acceleration value may be used as the threshold as it is without integrating the acceleration value. Moreover, the airbag deployment control and the seat belt restraint control may start simultaneously using a crash signal as a trigger as in the above example. When it is possible to predict a crash using a radar or the like but it is not possible to avoid a crash, the seat belt restraint control may start immediately before a crash. In any case, the seat belt and the airbag are appropriately controlled so that an occupant can be protected as much as possible before and after a crash.

Second Embodiment

Figure 7:
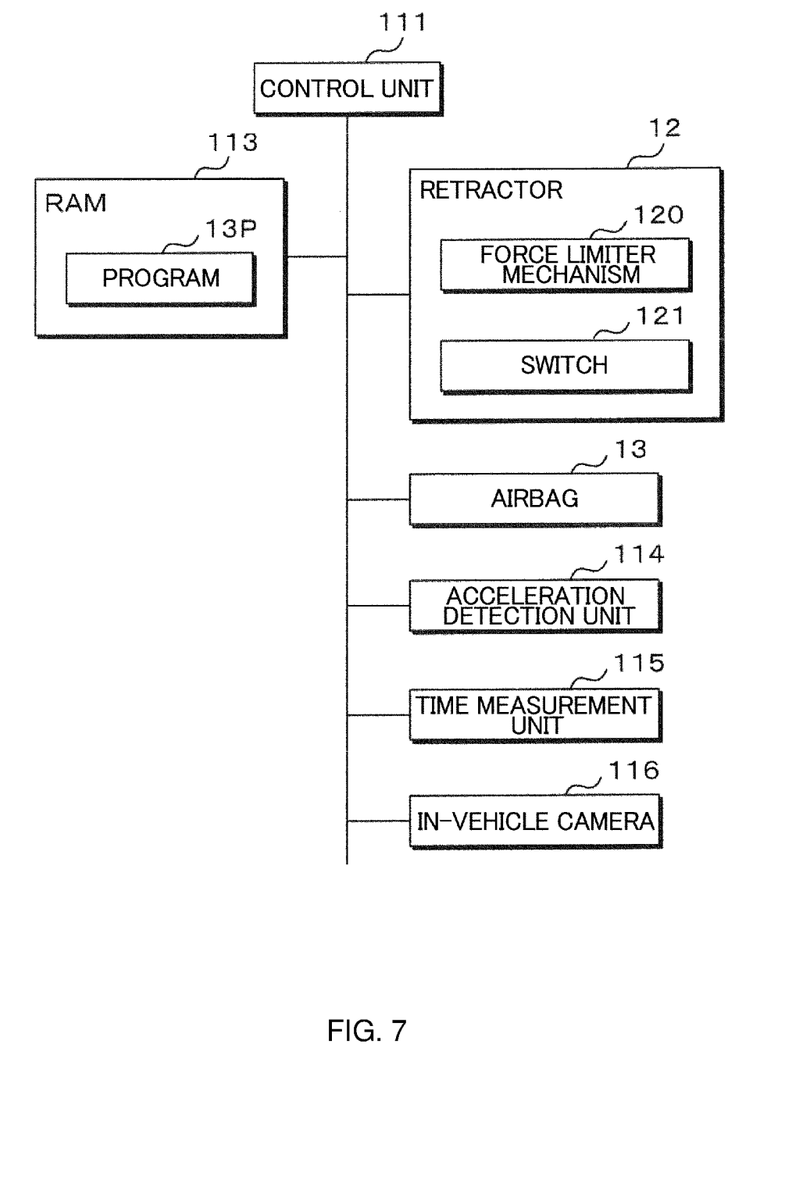
FIG. 7 is a block diagram illustrating a hardware configuration of the occupant protection device.

A second embodiment relates to an embodiment of determining whether the occupant A moves in the vehicle width direction with the aid of an in-vehicle camera 116. Hereinafter, the second embodiment of the present invention will be described in detail based on the drawings illustrating the embodiment. FIG. 7 is a block diagram illustrating a hardware configuration of the occupant protection device 1. In the present embodiment, the vehicle includes the in-vehicle camera (imaging unit) 116. The in-vehicle camera 116 is an imaging device for imaging the vehicle interior and is a charge-coupled device (CCD) camera, a complementary metal oxide semiconductor (CMOS) camera, or the like, for example. The in-vehicle camera 116 outputs the imaged video image to the control unit 111 by CAN communication.

The control unit 111 acquires the video image from the in-vehicle camera 116 and performs image processing of the acquired video image to determine whether occupant A is moving in the vehicle width direction. The image processing is difference matching or pattern matching, for example. Difference detection is a technique of determining whether an object in an image is moving or not by detecting a difference between images. Pattern matching is a technique of determining whether an image identical to a pattern image is included in the image. In the present embodiment, pattern matching is used as the image processing. The control unit 111 determines whether an image identical to a pattern image of the occupant A is present by performing pattern matching on the images in the video image every predetermined period. The control unit 111 determines that the occupant A is moving the vehicle width direction when an image identical to the pattern image of the occupant A is moving in one vehicle width direction every predetermined time interval. After the airbag 13 is sufficiently deployed toward the front of the occupant A while the occupant A having a predetermined physique or larger is restrained with the first load, when the control unit 111 determines that the occupant A is moving in the vehicle width direction, the control unit 111 does not switch the restraint load so as not to decrease but maintains the first load.

Figure 8:
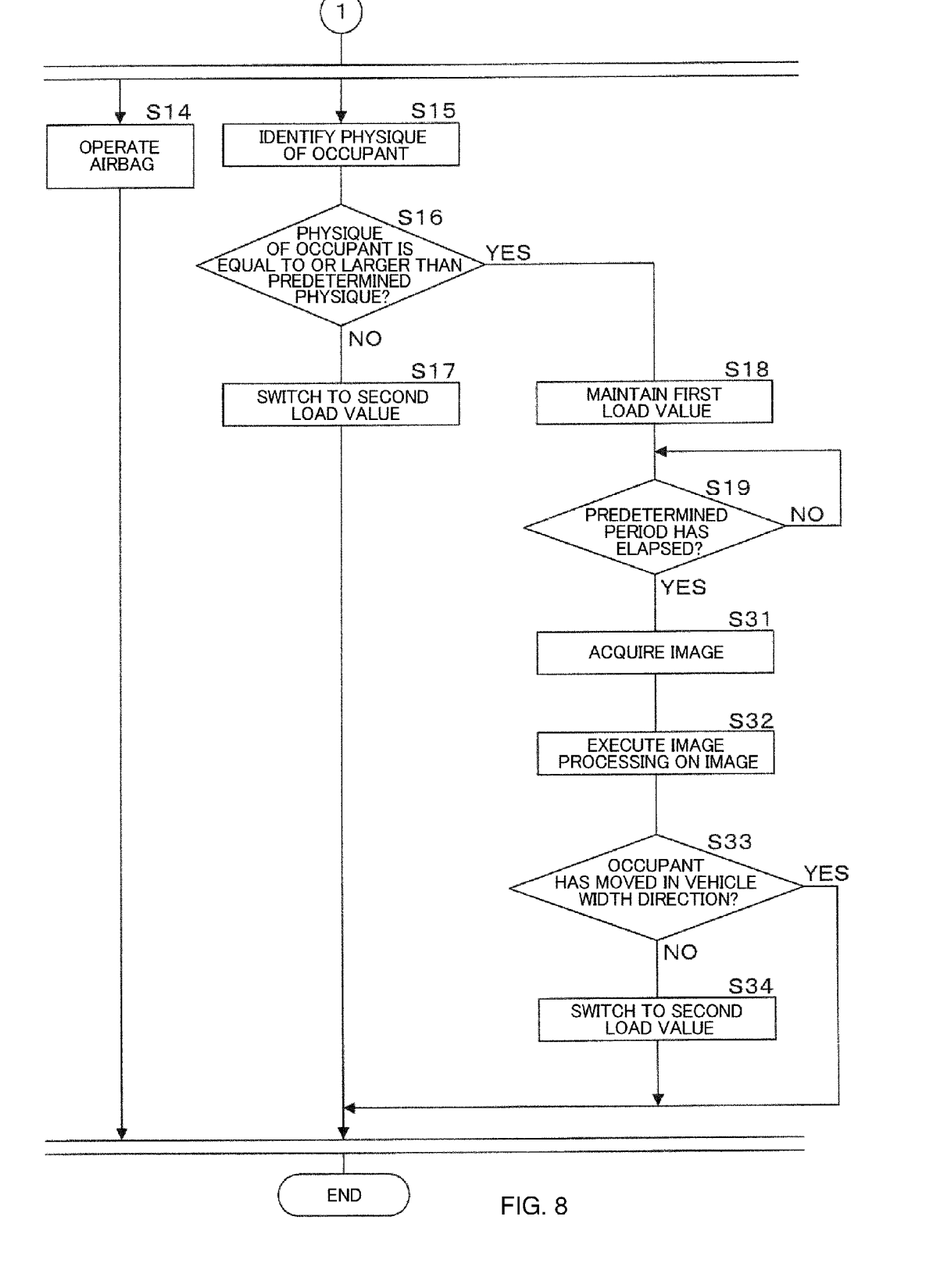
FIG. 8 is a flowchart illustrating a processing procedure of the control unit according to the present embodiment.

FIG. 8 is a flowchart illustrating a processing procedure of the control unit 111 according to the second embodiment. Since the processes of steps S20 to S23 are the same as those of an information processing system according to the first embodiment, the description thereof will not be provided for the sake of simplicity. When a determination result of YES is obtained in step S19, the control unit 111 acquires a realtime image (video image) of the occupant from the in-vehicle camera 116 (step S31). The control unit 111 executes image processing on the acquired image (step S32). The control unit (movement determining unit) 111 determines whether the occupant A has moved in the vehicle width direction by performing image processing on the acquired image (step S33). When it is determined by the image processing on the acquired image that the occupant A has not moved in the vehicle width direction (step S33: NO), the control unit 111 switches the restraint load to the second load value with the aid of the switch 121 (step S34) and ends the process (corresponding to FIG. 4B). When it is determined by the image processing on the acquired image that the occupant A has moved in the vehicle width direction (step S33: YES), the control unit 111 maintains the restraint load (step S34) and ends the process (corresponding to FIG. 4C).

In one aspect, it is possible to accurately understand that the occupant A is moving in the vehicle width direction by acquiring a video image from the in-vehicle camera 116. The airbag deployment control and the seat belt restraint control may start simultaneously using a crash signal as a trigger as in the above example. When it is possible to predict a crash using a radar or the like but it is not possible to avoid a crash, the seat belt restraint control may start immediately before a crash. In any case, the seat belt and the airbag are appropriately controlled so that an occupant can be protected as much as possible before and after a crash.

While the above description constitutes the preferred embodiment of the present invention, it will be appreciated that the invention is susceptible to modification, variation and change without departing from the proper scope and fair meaning of the accompanying claims.

What is claimed is:

1. An occupant protection device that operates an airbag and provides switching of a restraint load of a seat belt during a vehicle impact, and limiting a force with which the seat belt restrains an occupant according to a physique of the occupant, between a first load value and a second load value smaller than the first load value, the occupant protection device comprising:
   a physique identification unit that identifies the physique of the occupant;
   a physique determining unit that determines whether the physique of the occupant identified by the physique identification unit is equal to or larger than a predetermined physique;
   an acceleration acquisition unit that determines an acceleration value in a vehicle width direction during the vehicle impact;
   an acceleration determining unit that determines whether the acceleration value acquired by the acceleration acquisition unit is equal to or smaller than a predetermined value; and
   a switching unit that switches the restraint load of the seat belt between the first load value and the second load value based on the determinations obtained by the physique determining unit and the acceleration determining unit, wherein
   the switching unit switches the restraint load of the seat belt to the second load value after a predetermined time during the vehicle impact when the physique determining unit determines that the physique of the occupant is equal to or larger than the predetermined physique and the acceleration determining unit determines that the acceleration value in the vehicle width direction is equal to or smaller than the predetermined value, and maintains the restraint load of the seat belt at the first load value after the predetermined time when the physique determining unit determines that the physique of the occupant is equal to or larger than the predetermined physique and the acceleration determining unit determines that the value based on the acceleration value in the vehicle width direction is larger than the predetermined value.

2. An occupant protection device in accordance with claim 1 further comprising the switching unit switches the restraint load to the second load value when the physique determining unit determines that the physique of the occupant is smaller than the predetermined physique.

3. An occupant protection device in accordance with claim 2 further comprising the switching unit maintaining the restraint load at the second load value when the acceleration determining unit determines that the acceleration value in the vehicle width direction is larger or smaller than the predetermined value and the physique determining unit determines that the physique of the occupant is smaller than the predetermined physique.

4. An occupant protection device in accordance with claim 1 further comprising wherein the predetermined time is related to the time of completion of filling of the airbag after the vehicle impact.

5. An occupant protection device that operates an airbag and provides switching of a restraint load of a seat belt during a vehicle impact, and limiting a force with which the seat belt restrains an occupant according to a physique of the occupant, between a first load value and a second load value smaller than the first load value, the occupant protection device comprising:
   a physique identification unit that identifies the physique of the occupant;
   a physique determining unit that determines whether the physique of the occupant identified by the physique identification unit is equal to or larger than a predetermined physique;
   a movement determining unit that determines whether the occupant has moved in a vehicle width direction during the vehicle impact; and
   a switching unit that switches the restraint load of the seat belt between the first load value and the second load value based on the results obtained by the physique determining unit and the movement determining unit, wherein
   the switching unit switches the restraint load of the seat belt to the second load value after a predetermined time during the vehicle impact when the physique determining unit determines that the physique of the occupant is equal to or larger than the predetermined physique and the movement determining unit determines that the occupant has not moved in the vehicle width direction, and maintains the restraint load of the seat belt at the first load value after the predetermined time when the physique determining unit determines that the physique of the occupant is equal to or larger than the predetermined physique and the movement determining unit determines that the occupant has moved in the vehicle width direction.

6. The occupant protection device according to claim 5, further comprising:
   an imaging unit that images a vehicle interior to obtain an image, wherein
   the movement determining unit determines whether the occupant has moved in the vehicle width direction by performing image processing on the image obtained by the imaging unit.

7. An occupant protection device in accordance with claim 5 further comprising the switching unit switches the restraint load to the second load value when the physique determining unit determines that the physique of the occupant is smaller than the predetermined physique.

8. An occupant protection device in accordance with claim 7 further comprising the switching unit maintaining the restraint load at the second load value when the movement determining unit determines that the occupant has either moved or has not moved in the vehicle width direction.

9. An occupant protection device in accordance with claim 5 further comprising wherein the predetermined time is related to the time of completion of filling of the airbag.

10. A method for operating an occupant protection device that is configured to operate an airbag and switch a restraint load of a seat belt during a vehicle impact and limiting a force with which the seat belt restrains an occupant according to a physique of the occupant, between a first load value and a second load value smaller than the first load value, comprising the steps of:
   determining whether the physique of the occupant is equal to or larger than a predetermined physique;
   determining whether an acceleration value in a vehicle width direction during the vehicle impact is equal to or smaller than a predetermined value;
   switching the restraint load of the seat belt to the second load value during restraint of the seat belt after a predetermined time during the vehicle impact when it is determined that the physique of the occupant is equal to or larger than the predetermined physique and the acceleration value in the vehicle width direction is equal to or smaller than the predetermined value; and
   maintaining the restraint load of the seat belt at the first load value after the predetermined time when it is determined that the physique of the occupant is equal to or larger than the predetermined physique and that the value based on the acceleration value in the vehicle width direction is larger than the predetermined value.

11. A method in accordance with claim 10 further comprising the switching unit switching the restraint load to the second load value when the physique determining unit determines that the physique of the occupant is smaller than the predetermined physique.

12. A method in accordance with claim 11 further comprising the switching unit maintaining the restraint load at the second load value when the acceleration determining unit determines that the acceleration value in the vehicle width direction is larger or smaller than the predetermined value and the physique determining unit determines that the physique of the occupant is smaller than the predetermined physique.

13. A method in accordance with claim 10 further comprising relating the predetermined time to the time of completion of filling of the airbag after the vehicle impact.

14. A method for operating an occupant protection device that is configured to operate an airbag and switch a restraint load of a seat belt during a vehicle impact and limiting a force with which the seat belt restrains an occupant according to a physique of the occupant, between a first load value and a second load value smaller than the first load value, comprising the steps of:
   determining whether the physique of the occupant is equal to or larger than a predetermined physique;
   determining whether the occupant has moved in a vehicle width direction during the vehicle impact;
   switching the restraint load of the seat belt to the second load value during restraint of the seat belt after a predetermined time during the vehicle impact when it is determined that the physique of the occupant is equal to or larger than the predetermined physique and that the occupant has not moved in the vehicle width direction; and
   maintaining the restraint load of the seat belt at the first load value when it is determined that the physique of the occupant is equal to or larger than the predetermined physique and that the occupant has moved in the vehicle width direction.

15. A method in accordance with claim 14 further comprising the switching unit switching the restraint load to the second load value when the physique determining unit determines that the physique of the occupant is smaller than the predetermined physique.

16. A method in accordance with claim 15 further comprising the switching unit maintaining the restraint load at the second load value when the movement determining unit determines that the occupant has either moved or has not moved in the vehicle width direction.

17. A method in accordance with claim 14 further comprising relating the predetermined time to the time of completion of filling of the airbag.

* * * * *